US010378821B2

(12) United States Patent
Leppert et al.

(10) Patent No.: US 10,378,821 B2
(45) Date of Patent: Aug. 13, 2019

(54) FOOD DEHYDRATOR WITH PIVOTING, SLIDING DOOR

(71) Applicant: Hamilton Beach Brands, Inc., Glen Allen, VA (US)

(72) Inventors: Kevin L Leppert, Lenexa, VA (US); Joseph R Elliott, Henrico, CA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 80 days.

(21) Appl. No.: 15/492,282

(22) Filed: Apr. 20, 2017

(65) Prior Publication Data

US 2018/0306510 A1 Oct. 25, 2018

(51) Int. Cl.
| | | |
|---|---|---|
| *F26B 25/12* | (2006.01) | |
| *A23L 3/40* | (2006.01) | |
| *E06B 3/50* | (2006.01) | |
| *F26B 9/00* | (2006.01) | |

(52) U.S. Cl.
CPC ............ *F26B 25/12* (2013.01); *A23L 3/40* (2013.01); *E06B 3/5063* (2013.01); *F26B 9/003* (2013.01); *A23V 2002/00* (2013.01)

(58) Field of Classification Search
CPC ... F26B 25/12; F26B 9/06; A23L 3/40; A23V 2002/00; E06B 5/00; E06B 3/5063
USPC ........................................................ 34/201
See application file for complete search history.

(56) References Cited

U.S. PATENT DOCUMENTS

| | | | | | |
|---|---|---|---|---|---|
| 4,110,916 | A | * | 9/1978 | Bemrose | A23B 7/0205 34/197 |
| 4,143,592 | A | * | 3/1979 | Kuest | A21C 13/00 99/483 |
| 4,531,306 | A | * | 7/1985 | Erickson | F26B 25/22 34/225 |
| 4,585,142 | A | * | 4/1986 | Chulich | A47J 36/06 220/377 |
| 4,862,792 | A | * | 9/1989 | Lerma, Jr. | A47J 37/0704 99/401 |
| 5,184,599 | A | * | 2/1993 | Stuart | A47J 37/0704 126/25 R |
| 5,375,511 | A | * | 12/1994 | Huie | A47J 36/2483 219/386 |
| 5,823,381 | A | * | 10/1998 | Ashley | A47J 47/12 220/559 |
| 5,878,508 | A | * | 3/1999 | Knoll | A01J 11/04 34/197 |
| 6,054,686 | A | * | 4/2000 | Pauly | A21B 1/26 126/21 A |
| 6,796,223 | B2 | * | 9/2004 | Jiang | A23L 3/40 219/400 |
| 6,874,496 | B2 | * | 4/2005 | Waits | A23B 4/044 126/1 D |

(Continued)

*Primary Examiner* — Stephen M Gravini
(74) *Attorney, Agent, or Firm* — Alexander D. Raring (57) ABSTRACT

A food dehydrator comprises a housing and a door slidably and pivotably affixed to the housing. The housing defines a food cavity and has an opening defined in the housing to enable access to the food cavity. The housing comprises opposing top and bottom walls, a back wall opposite the opening, and opposing side walls. The door is selectively movable between a closed position closing off the opening thereby blocking access to the food cavity and an open position enabling access to the food cavity. The door, when in the open position, may rest on the top wall.

7 Claims, 11 Drawing Sheets

(56) References Cited

U.S. PATENT DOCUMENTS

| | | | | |
|---|---|---|---|---|
| 8,448,602 B2* | 5/2013 | Lytle | ............... | A01K 5/0233 |
| | | | | 119/55 |
| 8,490,614 B1* | 7/2013 | Gregory | ............. | A47J 37/0754 |
| | | | | 126/1 R |
| 9,615,604 B2* | 4/2017 | Russick | ............... | A23N 17/004 |
| 2011/0280999 A1* | 11/2011 | Crystal | ............... | A21C 15/002 |
| | | | | 426/231 |
| 2018/0112911 A1* | 4/2018 | Ivanovic | ................ | F24C 7/085 |
| 2018/0306510 A1* | 10/2018 | Leppert | ................ | F26B 25/12 |

\* cited by examiner

FOOD DEHYDRATOR WITH PIVOTING, SLIDING DOOR

BACKGROUND OF THE DISCLOSURE

The present disclosure relates generally to small appliances, and more particularly to food dehydrators.

A food dehydrator is a kitchen appliance used for drying food. Dehydration is a method of food preservation in which moisture is removed from the food, thereby extending the shelf life of the food by decreasing the growth of bacteria and minimizing spoilage. Food dehydrators components work together to circulate air around a food item to thereby remove moisture from the food and exhaust the moisture from the food dehydrator.

Food dehydrators typically comprise a housing or housings that defines a food cavity. Several food trays, which hold the food to be dehydrated, may be removably insertable into the food cavity via an opening defined in the housing. A door selectively closes off the opening during the dehydrating process. The food trays are typically large to enable a large amount of food to be dehydrated at the same time. To facilitate inserting and removing the large food trays, the opening in the housing and therefore the doors are correspondingly large.

Conventional food dehydrators have doors that conventionally hinge open, via a bottom edge hinge or a side edge hinge, or have doors that are removable. Conventionally hinged doors may hinder access to the opening, as the large doors present an obstacle even when open. Conventional removable doors may be misplaced, damaged, or soiled when removed from the food dehydrator.

It has heretofore not been discovered how to create a food dehydrator which provides unobstructed access to the opening and food cavity without the risk that comes with removable doors. The food dehydrator of the following disclosure accomplishes the above and other objectives and overcomes at least the above-described disadvantages of conventional food dehydrators.

BRIEF SUMMARY OF THE DISCLOSURE

A food dehydrator is disclosed herein. In one embodiment of the subject device, a food dehydrator comprises a housing and a door slidably and pivotably affixed to the housing. The housing defines a food cavity and has an opening defined in the housing to enable access to the food cavity. The housing comprises opposing top and bottom walls, a back wall opposite the opening, and opposing side walls. The door is selectively movable between a closed position closing off the opening and blocking access to the food cavity and an open position enabling access to the food cavity. The door, when in the open position, may rest on the top wall.

The door may comprise two flanges, each flange extending from a respective side edge of the door, each flange defining an elongated slot. The housing may further comprise two retaining pins. Each retaining pin is affixed to and projecting from a respective side wall. Each retaining pin comprises a cylindrical body and an enlarged head. Each retaining pin engages the slot on a respective door flange to enable the door to move slidably and pivotably in relation to the housing.

The food dehydrator may further comprise two bushings, each bushing surrounding the cylindrical body of a respective retaining pin. The retaining pins may be removably affixed to their respective side walls to enable the door to be separated from the housing.

The housing may comprise two flanges, each flange extending from a respective side wall and having a gap. Each door flange may comprise an inwardly-projecting protrusion which cooperates with a respective side wall flange such that the door is prevented from pivoting open unless the door flange protrusions are aligned with the gap of each respective side wall flange.

The door may further comprise a trim piece affixed to a top edge of the door and positioned such that the trim piece at least partially obstructs a gap between the door and the top wall when the door is in the closed position and such that the trim piece prevents contact between the door and a top surface of the top wall when the door is in the open position. Some or all of the trim piece may be constructed of a material selected to enable the trim piece to readily move in slidable contact with the top surface of the top wall.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 3:
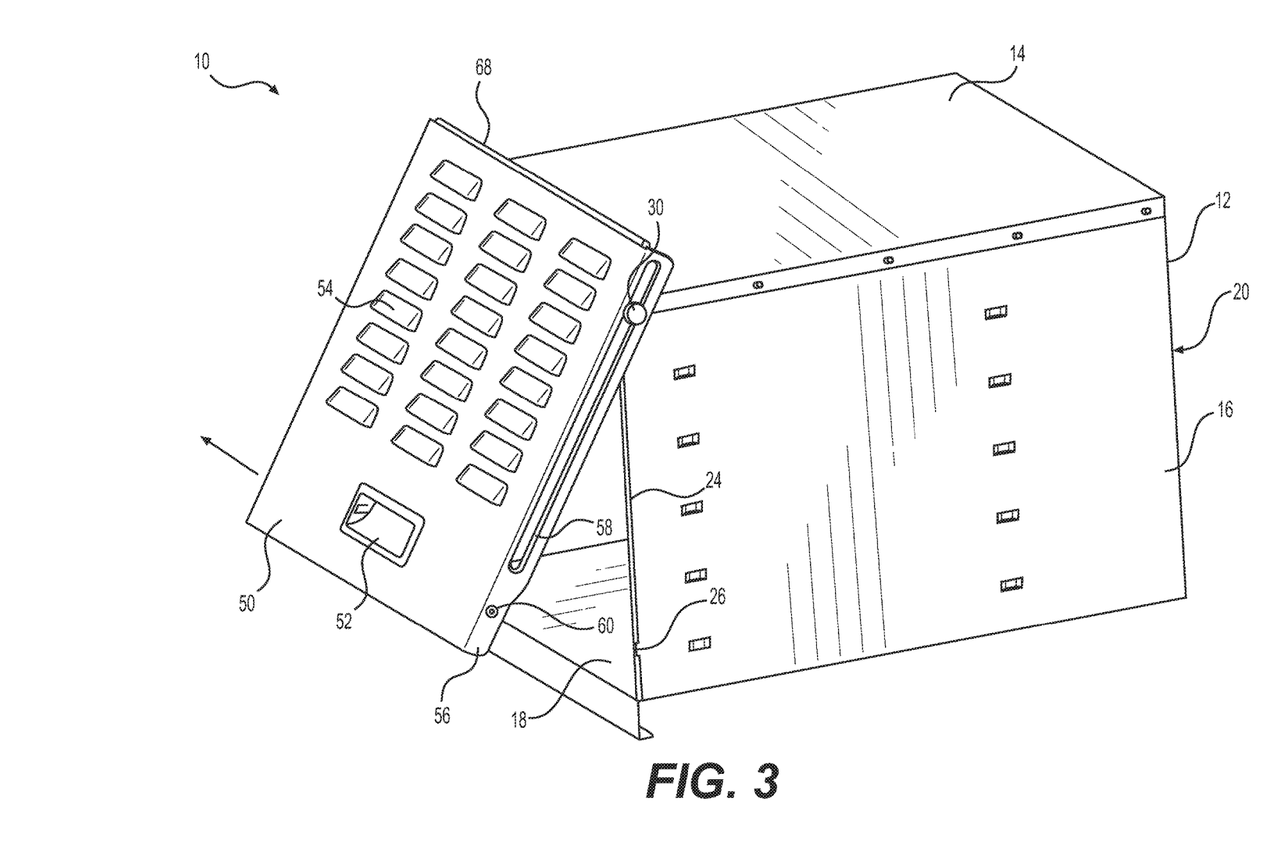
Figure 4:
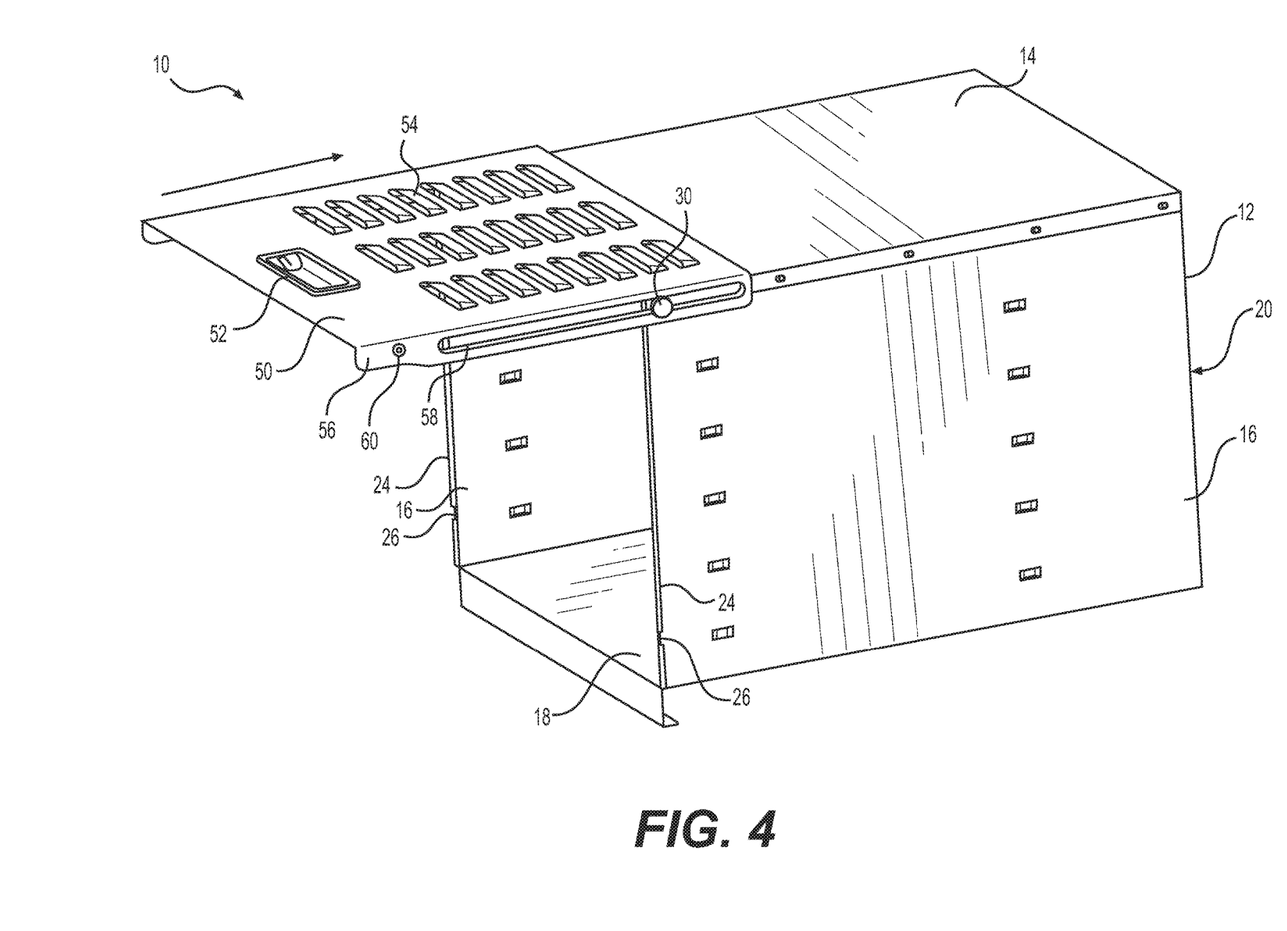
Figure 5:
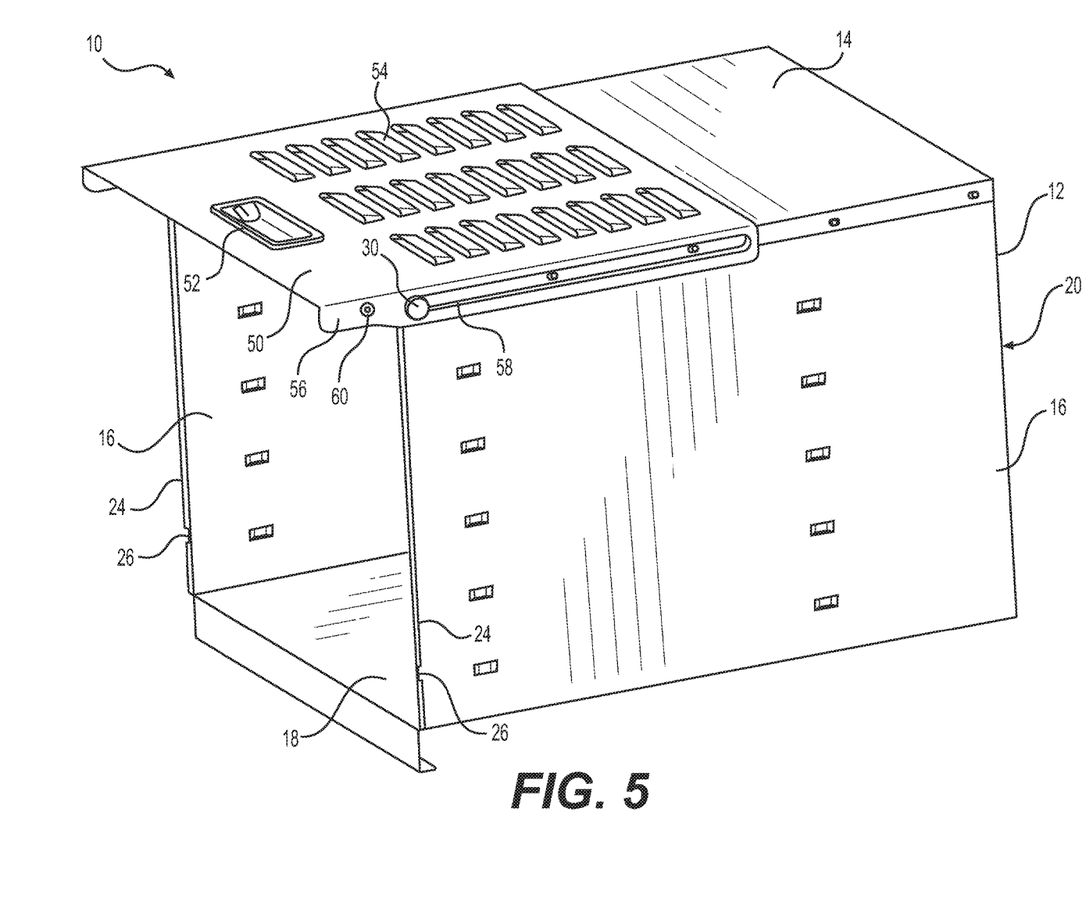
FIG. 5 is a perspective view of the food dehydrator of FIG. 1, with its door fully opened.

Referring to the drawings in detail, wherein like numerals indicate like elements throughout, FIGS. 1-11 illustrate a food dehydrator in accordance with a preferred embodiment of the present disclosure. The food dehydrator 10 of embodiments of the present disclosure comprises a housing 12 and a door 50. Advantageously, as described further below, the door 50 is both slidably and pivotably affixed to the housing 12. The housing 12 defines a food cavity and has an opening defined in the housing to enable access to the food cavity (the opening and food cavity are visible in FIGS. 3-6). The housing 12 comprises a top wall 14, an opposing bottom wall 18, a back wall 20 opposite the opening, and opposing side walls 16. The door 50 is selectively movable between a closed position (illustrated in FIG. 1) closing off the opening thereby blocking access to the food cavity and an open position (illustrated in FIG. 5) enabling access to the food cavity. Advantageously, as seen in FIG. 5, the door 50, when in the open position, rests on the top wall 14. Thus, the door is out of the way and does not obstruct the opening, but is still attached to the housing to prevent the door from being misplaced, damaged, or soiled.

To enable the door 50 to be both slidably and pivotably affixed to the housing 12, the door 50 is retained to the housing 12 via pivot/retaining screws 30 (which may also be termed retaining pins) that engage with elongated slots 58 on opposing sides of the door 50. The pivot/retaining screws 30 are positioned near the top, front corners of the side walls 16. The door 50 comprises a typically planar main body, which, in the illustrated embodiment, comprises a handle 52, and a plurality of air vents 54. The door 50 comprises two flanges 56, each flange extending from a respective side edge of the door 50. Each flange 56 defines one of the elongated slot 58 that engage with respective ones of the pivot/retaining screws 30.

Figure 1:
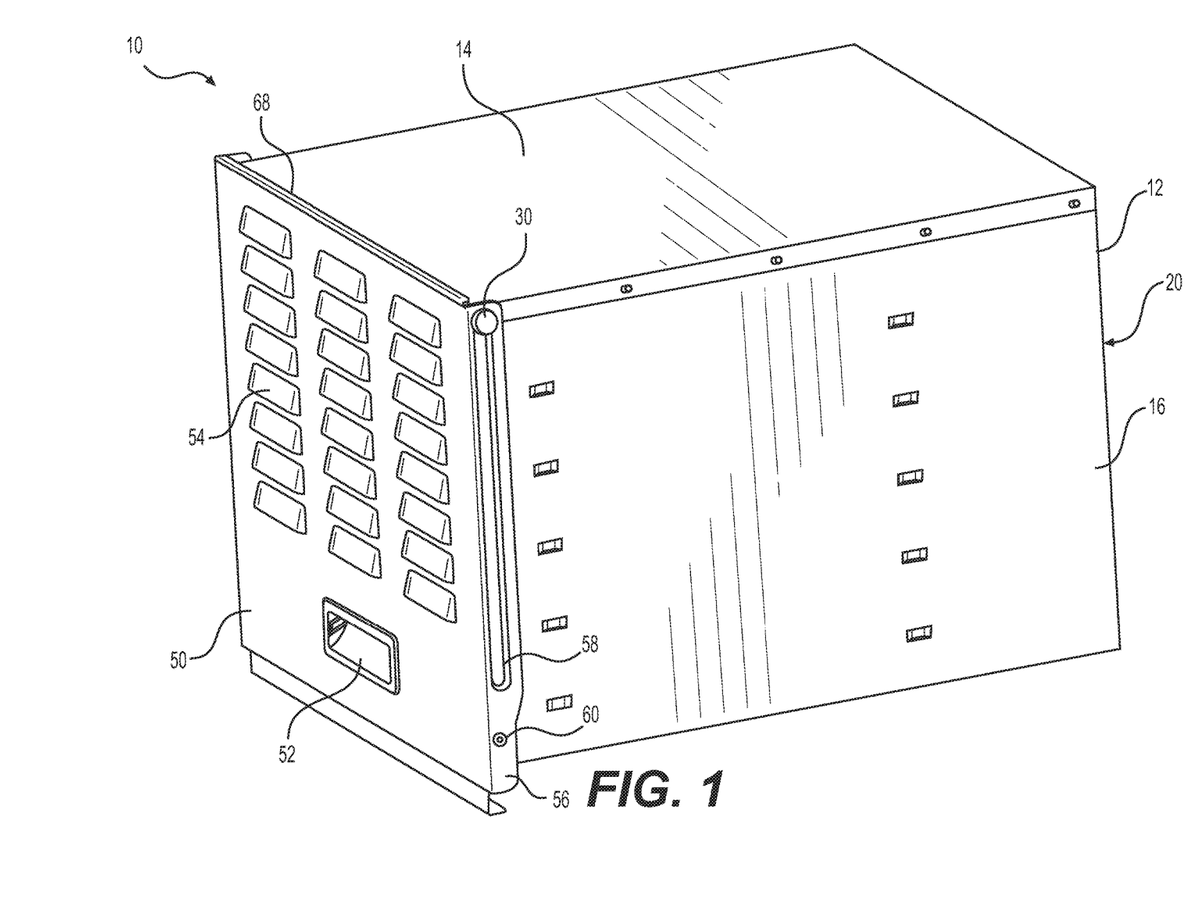
FIG. 1 is a perspective view of a food dehydrator with its door closed, according to one embodiment of the invention.
Figure 2:
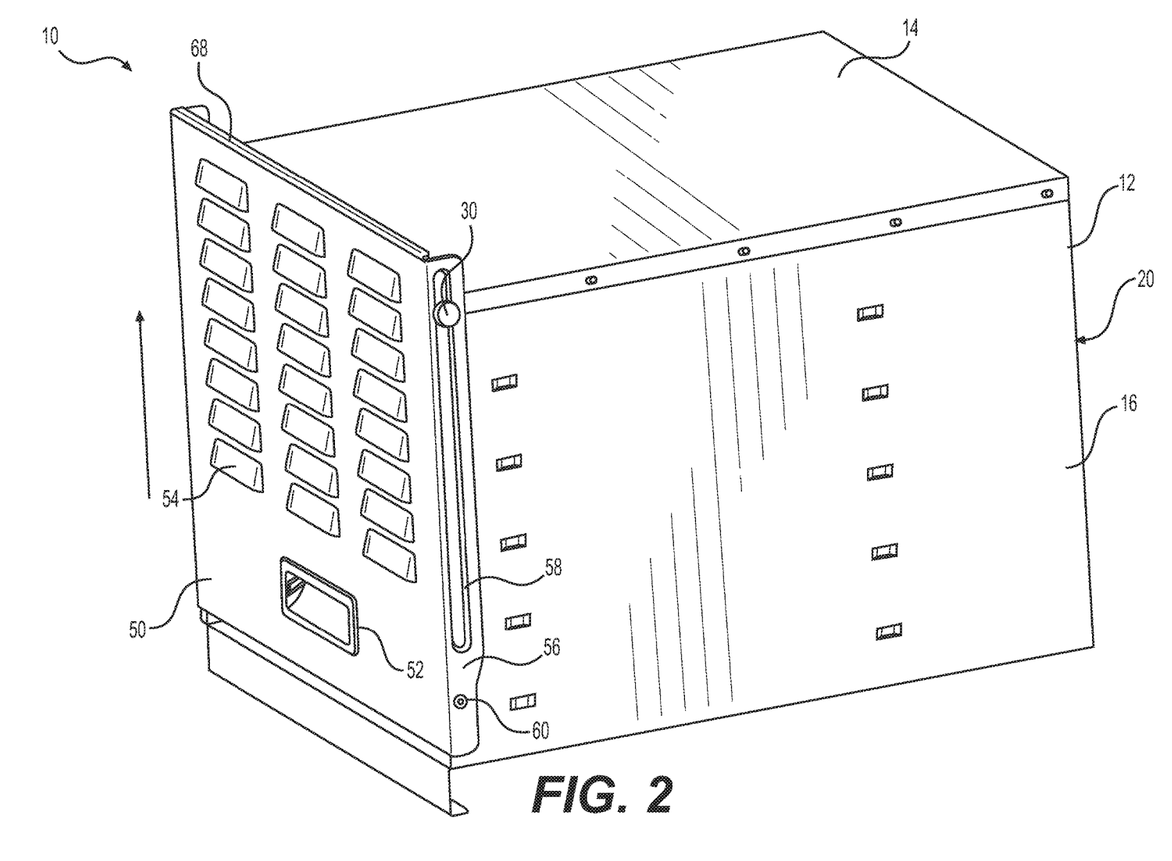
FIGS. 2-4 are perspective views of the food dehydrator of FIG. 1, in various stages of its door being opened.

As illustrated in FIGS. 2-5, the engagement between the pivot/retaining screws 30 and the elongated slots 58 enable the door 50 to slide relative to the pivot/retaining screws 30 as seen in FIGS. 2 and 4 and to pivot relative to the pivot/retaining screws 30 as seen in FIG. 3. The combination of pivoting and sliding the door 50 (either at the same time or at different times) enables the door to be moved between (a) the closed position of FIG. 1 in which the door 50 obstructs the opening of the housing and (b) the open position of FIG. 5 in which the door 50 rests on the top wall 14 and does not obstruct the opening. The operation of opening and closing of the door 50 will be described in more detail below.

In the illustrated embodiment of the present disclosure, the housing 12 comprises two flanges 24, each flange extending outwardly from a front edge of a respective side wall 16, as seen in FIGS. 3-6. Each side wall flange 24 has a gap 26. Each door flange 56 comprises an inwardly-projecting protrusion 60 (best seen in FIGS. 7 and 8). The protrusions 60 of the door flanges engage with respective side wall flanges 24 to help retain the door in place obstructing the opening when the door is in its closed position. Specifically, when the door is fully closed, each protrusion 60 is behind its respective side wall flange 24 such that the door is prevented from pivoting open unless the door flange protrusions 60 are aligned with the gap 26 of each respective side wall flange 24.

To open the door from the closed position shown in FIG. 1, the door 50 is first slid upward (as illustrated by the arrow in FIG. 2) until the door flange protrusions 60 are aligned with the respective gaps 26 in the respective housing flange 24. When the door flange protrusions 60 are aligned with the respective gaps 26 in the respective side wall flange 24, the protrusions 60 are no longer retained by the side wall flanges 24 and the door 50 may then be pivoted outward and upward (as illustrated by the arrow in FIG. 3). The upward sliding of the door to align the protrusions 60 and gaps 26 and the subsequent outward pivoting of the door may be more easily accomplished by applying a slight outward pull on the door as the door is slid upward. In this regard, the door will pivot outward as soon as the protrusions 60 and gaps 26 align without having to coordinate the timing of the outward pivoting with the alignment of the protrusions 60 and gaps 26.

The door 50 may continue to be pivoted outward and upward until the door is generally parallel with the top wall 14 (as illustrated in FIG. 4). The door 50 may then be slid backward (as illustrated by the arrow in FIG. 4) to the extent allowed by the engagement between the elongated slots 58 and the pivot/retaining screws 30 to the fully open position illustrated in FIG. 5. The specific sliding and pivoting steps and/or the order of performance of those steps may vary. For example, instead of pivoting the door outward and upward until the door is generally parallel with the top wall 14 and then sliding the door backward, the door may be slid upward from the position shown in FIG. 3 to its full extent and then pivoted downward onto the top wall 14 into the position shown in FIG. 5.

Figure 6:
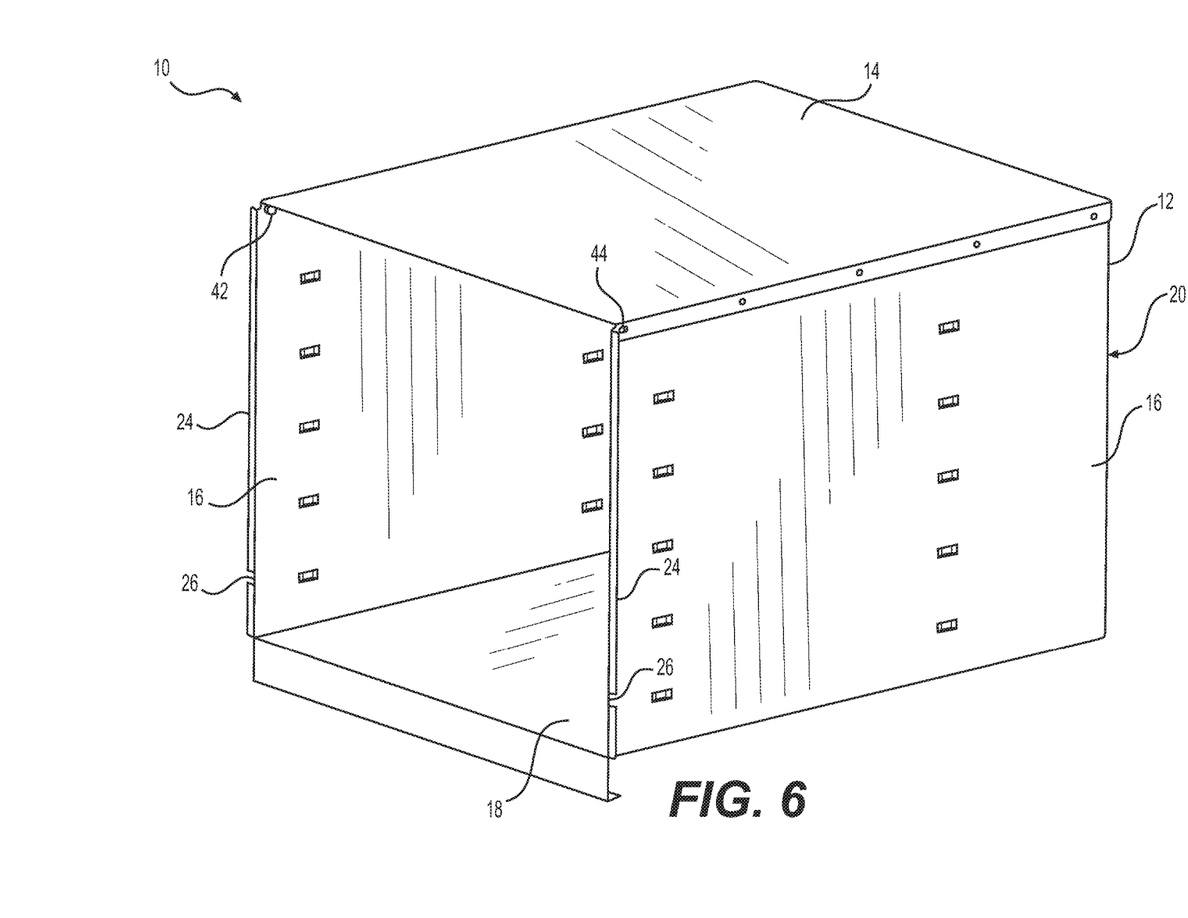
FIG. 6 is a perspective view of the food dehydrator of FIG. 1, with its door removed.
Figure 9:
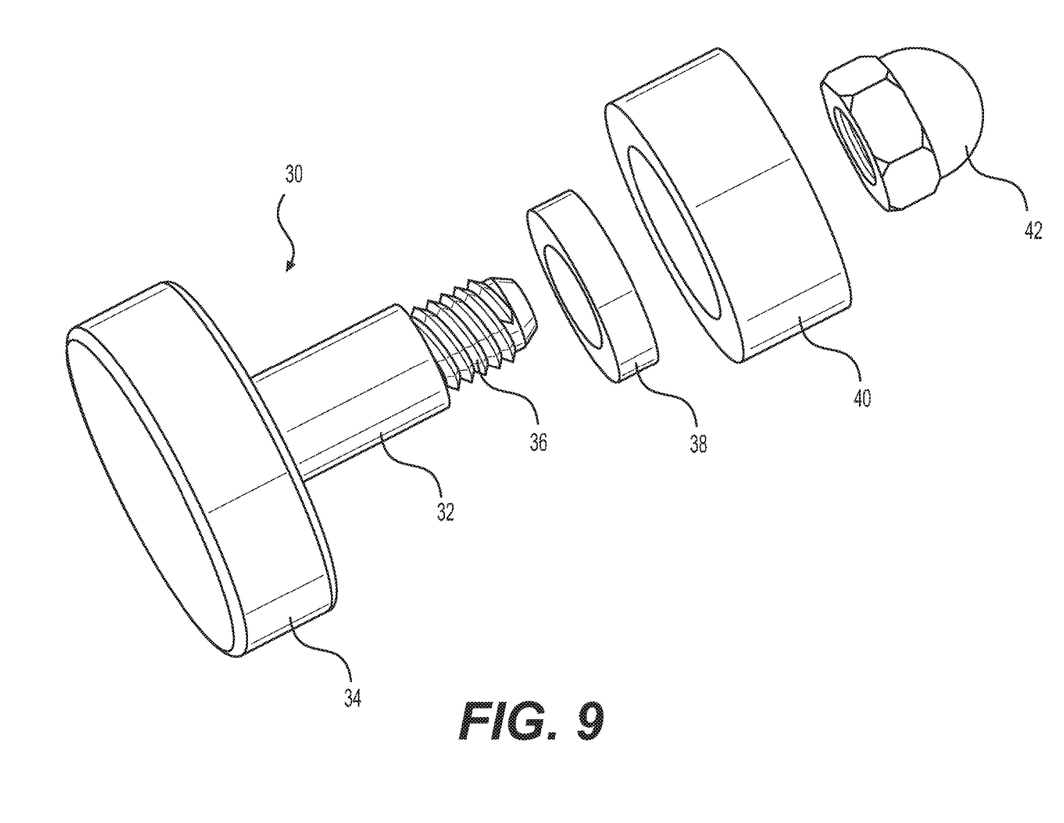
FIG. 9 is a perspective exploded view of the door attachment hardware of the food dehydrator of FIG. 1.
Figure 10:
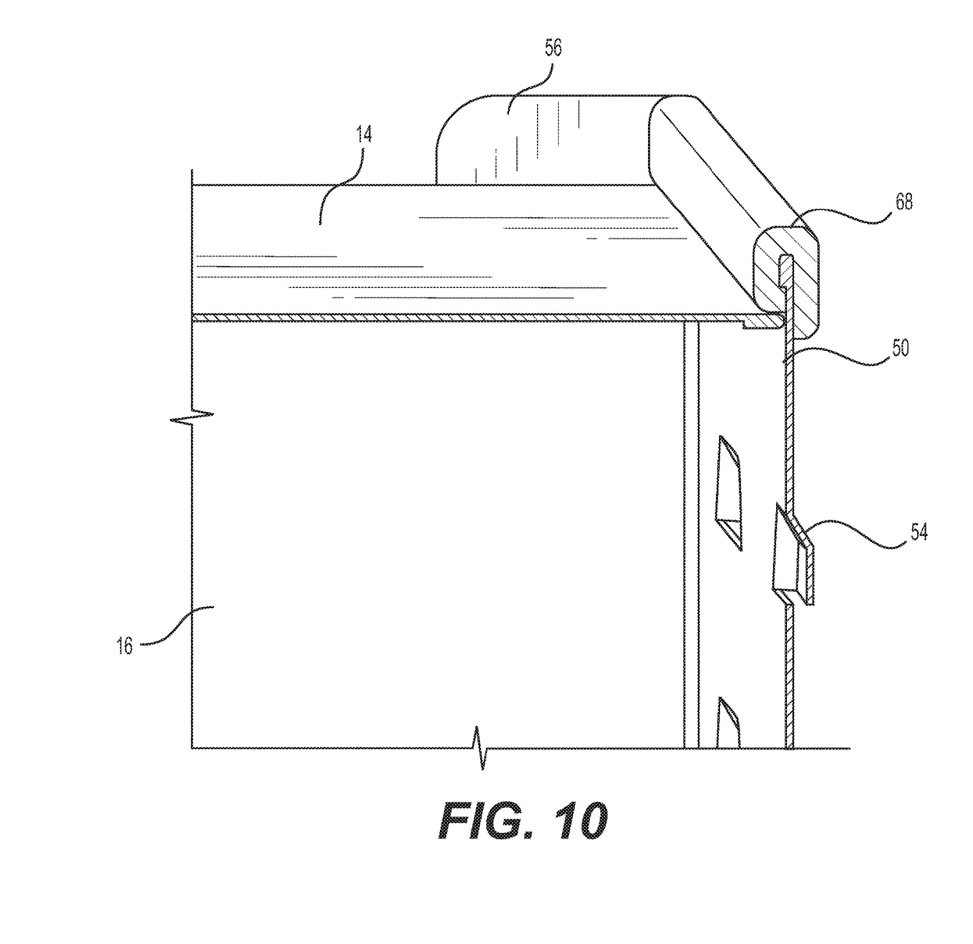
FIG. 10 is a side cross-sectional view of a portion of the food dehydrator of FIG. 1, with its door closed.
Figure 11:
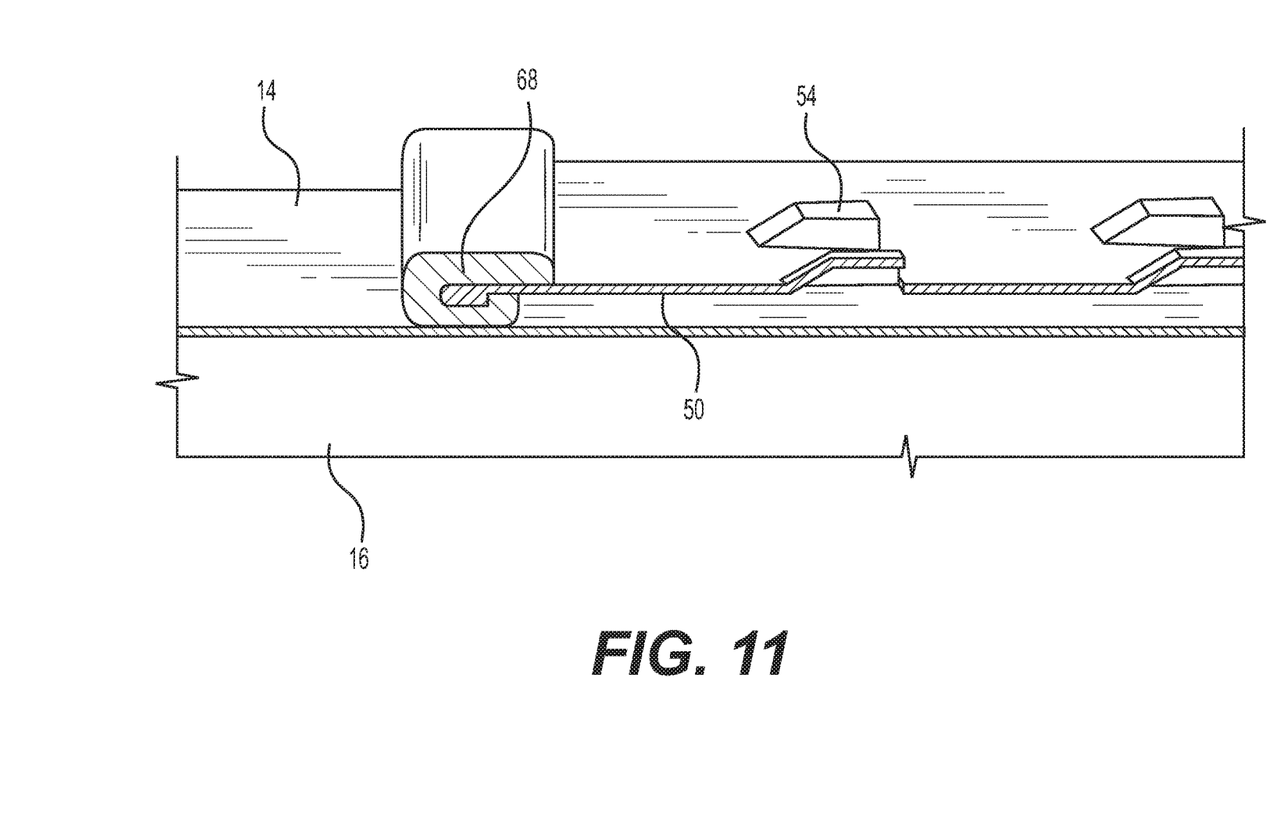
FIG. 11 is a side cross-sectional view of a portion of the food dehydrator of FIG. 1, with its door open.

While it is desirable to retain the door to the housing while the door is open, it may be desirable to be able to selectively remove the door as needed. FIG. 6 illustrates the food dehydrator 10 with the door removed. The pivot/retaining screws 30 enable the door 50 to be selectively retained to the housing or removable from the housing, in addition to enabling the pivoting and sliding movement of the door. As seen in FIG. 9, each pivot/retaining screw 30 comprises a cylindrical body 32, an enlarged head 34 (which may be knurled or otherwise textured for improved gripping) for turning the pivot/retaining screw for installation or removal, and a threaded distal end 36. The threaded distal end 36 selectively engages a nut 42 that is affixed to the inside surface of each side wall 16 (one of which is visible in FIG. 6) and aligned with a corresponding hole 44 in a respective side wall 16. The threaded distal end 36 of each pivot/retaining screw 30 is inserted through a respective hole 44 in the front, upper corner of each respective side wall 16 to selectively engage a respective nut 42, such that each pivot/retaining screw 30 projects generally perpendicularly from the front, upper corner of each respective side wall 16 when so engaged. Each pivot/retaining screw 30 may be inserted through a respective bushing 38 and spacer 40. The bushing 38 and (optionally) the spacer 40 are able to rotate freely around the cylindrical body 32 of the pivot/retaining screw 30. When the door 50 is in place and secured to the housing 12 via the pivot/retaining screws 30, each door flange 56 and respective pivot/retaining screw 30 are arranged such that (a) the cylindrical body 32 protrudes through the slot 58 in the door flange 56, (b) the enlarged head 34 is outside the door flange 56 to retain the door 50 to the housing 12, (c) the bushing 38 is within the slot 58 such that the inner surface of the slot engages with the perimeter surface of the bushing 38 to ease the pivoting and sliding movement of the door, and (d) the spacer 40 is between the inner surface of the door flange 56 and the outer surface of the side wall 16 to maintain a desired space between the door flange 56 and the side wall 16.

Figure 7:
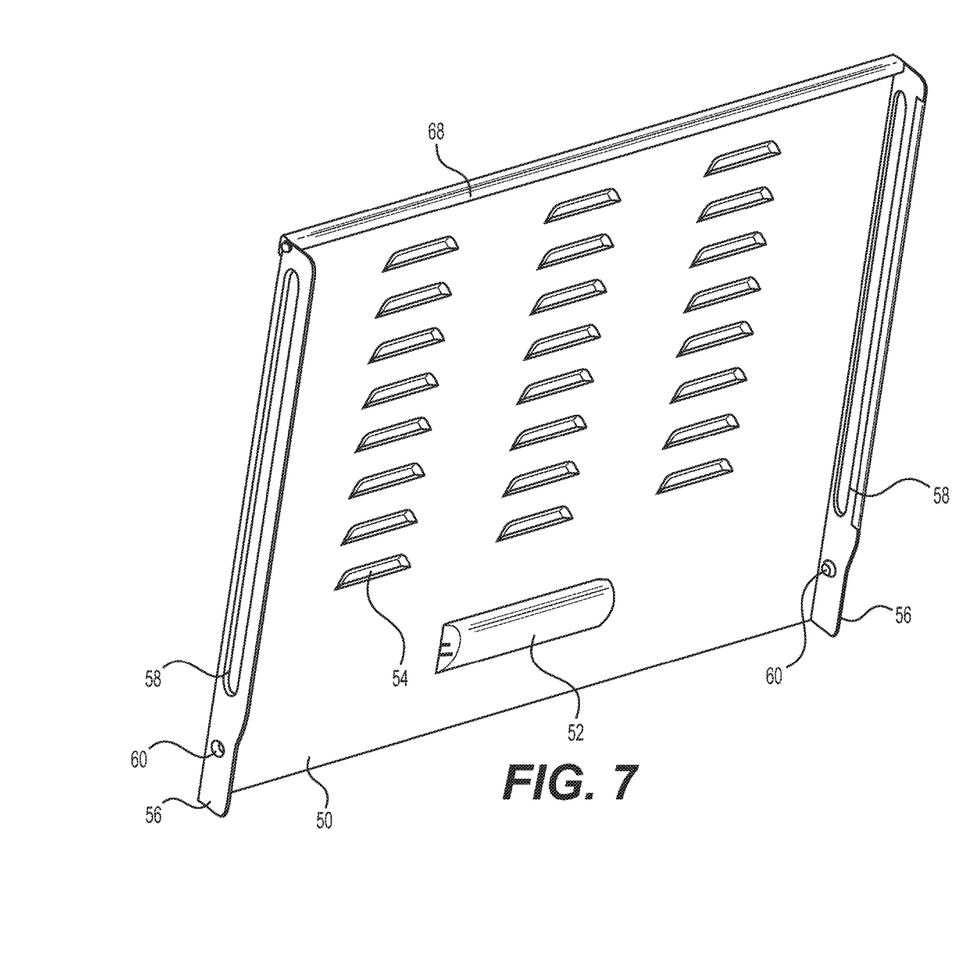
FIGS. 7 and 8 are rear perspective views of a door of the food dehydrator of FIG. 1 removed from the food dehydrator, according to alternative embodiments of the invention.
Figure 8:
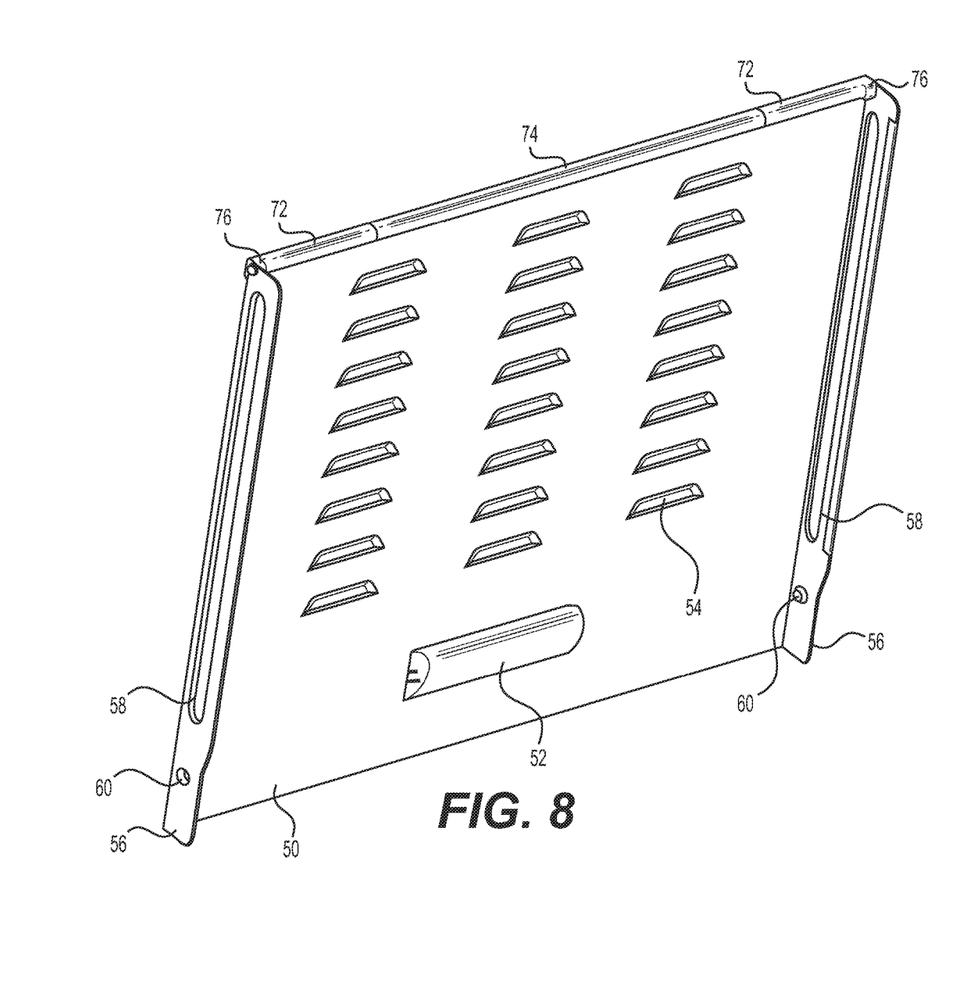

The door 50 may further comprise a trim piece affixed to a top edge of the door. FIGS. 7 and 8 illustrate two possible versions of such a trim piece, although other suitable versions may be used. The trim piece 68 in FIG. 7 is a single, unitary piece. In contrast, the trim piece in FIG. 8 comprises opposing side sections 72 and a center section 74, which may be constructed of different materials. The purpose of the trim piece is twofold. First, as seen in the cross-sectional view of FIG. 10, the trim piece at least partially obstructs a gap between the door 50 and the top wall 14 when the door is closed. Second, as seen in the cross-sectional view of FIG. 11, the trim piece provides a contact buffer between the top wall 14 and the door 50 to enable the sliding movement of the door in relation to the top wall without having the (typically metal) door scratch the top wall. The trim piece 68 of FIG. 7 has a uniform profile, such that almost the entire width of the trim piece comes in contact with the top wall. In contrast, the trim piece of FIG. 8 has an increased thickness on opposing ends 76, such that only the opposing ends 76 come in contact with the top wall. The trim piece may be constructed of any suitable material. The portion(s) of the trim piece that comes in contact with the top wall (i.e., either the entire trim piece of FIG. 7 or the side sections of the trim piece of FIG. 8) should be constructed of a low-friction material, such as polyoxymethylene (POM), to enable the trim piece and door to readily slide along the top wall.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A food dehydrator comprising:
   a housing defining a food cavity and having an opening defined in the housing to enable access to the food cavity, the housing comprising opposing top and bottom walls, a back wall opposite the opening, and opposing side walls;
   a door slidably and pivotably affixed to the housing and selectively movable between a closed position closing off the opening and blocking access to the food cavity and an open position enabling access to the food cavity, the door resting on the top wall when in the open position, the door comprising two door flanges, each door flange extending from a respective side edge of the door and defining an elongated slot; and
   a retaining pin affixed to and projecting from each side wall, each retaining pin engaging the slot of a respective door flange to enable the door to move slidably and pivotably in relation to the housing.

2. The food dehydrator of claim 1, wherein
   each retaining pin comprises a cylindrical body and an enlarged head.

3. The food dehydrator of claim 2, further comprising two bushings, each bushing surrounding the cylindrical body of a respective retaining pin.

4. The food dehydrator of claim 2, wherein each retaining pin is removably affixed to their respective side walls to enable the door to be separated from the housing.

5. The food dehydrator of claim 2, wherein the housing comprises two side wall flanges, each side wall flange extending from a respective side wall, each flange having a gap;
   wherein each door flange comprises an inwardly-projecting protrusion;
   wherein each door flange protrusion cooperates with a respective side wall flange such that the door is prevented from pivoting open unless the door flange protrusions are aligned with the gap of each respective side wall flange.

6. The food dehydrator of claim 1, wherein the door further comprises a trim piece affixed to a top edge of the door and positioned such that the trim piece at least partially obstructs a gap between the door and the top wall when the door is in the closed position and such that the trim piece prevents contact between the door and a top surface of the top wall when the door is in the open position.

7. The food dehydrator of claim 6, wherein some or all of the trim piece is constructed of a material selected to enable the trim piece to readily move in slidable contact with the top surface of the top wall.

* * * * *